(12) United States Patent
Zhang

(10) Patent No.: US 10,226,696 B2
(45) Date of Patent: Mar. 12, 2019

(54) MULTIPLAYER GAME MACHINE AND DISPLAY SYSTEM THEREOF

(71) Applicant: BOE Technology Group Co., Ltd., Beijing (CN)

(72) Inventor: Yongzhong Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 211 days.

(21) Appl. No.: 14/547,422

(22) Filed: Nov. 19, 2014

(65) Prior Publication Data

US 2016/0008714 A1    Jan. 14, 2016

(30) Foreign Application Priority Data

Jul. 11, 2014    (CN) .......................... 2014 1 0331747

(51) Int. Cl.
*A63F 13/27*    (2014.01)
*A63F 13/75*    (2014.01)
(Continued)

(52) U.S. Cl.
CPC .............. *A63F 13/27* (2014.09); *A63F 13/75* (2014.09); *A63F 13/90* (2014.09); *G06F 3/13* (2013.01); *G06F 21/60* (2013.01)

(58) Field of Classification Search
CPC .......... A63F 13/27; A63F 13/90; A63F 13/75; G06F 21/60; G06F 3/013; G09G 3/002
See application file for complete search history.

(56) References Cited

U.S. PATENT DOCUMENTS 4,288,937 A * 9/1981 Virsen ................. G09F 15/0068
                                                    211/182
4,788,094 A * 11/1988 Morita ..................... G02B 5/00
                                                    359/596
(Continued)

FOREIGN PATENT DOCUMENTS

CN        201237862 Y     5/2009
CN        201329179 Y    10/2009
(Continued)

OTHER PUBLICATIONS

Machine translation of JP2006192244 to Shiraishi et al.*
(Continued)

*Primary Examiner* — Kang Hu
*Assistant Examiner* — Malina D Blaise
(74) *Attorney, Agent, or Firm* — Westman, Champlin & Koehler, P.A.

(57) ABSTRACT

The present invention provides a display system for a multiplayer game machine, the display system comprising: a main body; and a main display region and a plurality of secondary display regions arranged in the main body. The main display region is configured to display common information associated with a game and being viewable by all game players, each of the secondary display regions is configured to display game information associated with a certain game player, and each of the secondary display regions has an anti-peeping device to prevent other game players from peeping the game information associated with the certain game player. The present invention further provides a multiplayer game machine comprising the display system.

16 Claims, 4 Drawing Sheets

(51) Int. Cl.
*A63F 13/90* (2014.01)
*G06F 3/13* (2006.01)
*G06F 21/60* (2013.01)

(56) References Cited

U.S. PATENT DOCUMENTS

| | | | | |
|---|---|---|---|---|
| 7,965,268 | B2* | 6/2011 | Gass | G02F 1/134363 |
| | | | | 345/87 |
| 8,362,975 | B2* | 1/2013 | Uehara | G02F 1/1323 |
| | | | | 345/32 |
| 8,534,708 | B2* | 9/2013 | Heim | B42D 25/29 |
| | | | | 235/488 |
| 9,235,967 | B1* | 1/2016 | Magee | G07F 19/201 |
| 9,335,449 | B2* | 5/2016 | Gaides | G02B 5/0263 |
| 2002/0170887 | A1* | 11/2002 | Furuta | B23K 15/0006 |
| | | | | 219/121.19 |
| 2004/0252374 | A1* | 12/2004 | Saishu | G02B 27/2214 |
| | | | | 359/462 |
| 2006/0016884 | A1* | 1/2006 | Block | G06K 19/08 |
| | | | | 235/381 |
| 2006/0126156 | A1* | 6/2006 | Evans | G02F 1/1323 |
| | | | | 359/320 |
| 2006/0287054 | A1* | 12/2006 | Walker | G07F 17/32 |
| | | | | 463/17 |
| 2009/0102990 | A1* | 4/2009 | Walton | G02F 1/1323 |
| | | | | 349/15 |
| 2009/0268295 | A1* | 10/2009 | Miller | G02B 1/11 |
| | | | | 359/576 |
| 2010/0197385 | A1* | 8/2010 | Aoki | G07F 17/32 |
| | | | | 463/27 |
| 2010/0220043 | A1* | 9/2010 | Broughton | G02F 1/1323 |
| | | | | 345/87 |
| 2010/0295827 | A1* | 11/2010 | Lim | G09G 3/20 |
| | | | | 345/204 |
| 2011/0018860 | A1* | 1/2011 | Parry-Jones | G09G 3/20 |
| | | | | 345/214 |
| 2011/0095974 | A1* | 4/2011 | Moriwaki | G09G 3/007 |
| | | | | 345/156 |
| 2011/0255039 | A1* | 10/2011 | Enomoto | G02F 1/133305 |
| | | | | 349/113 |
| 2012/0074217 | A1* | 3/2012 | Block | G06Q 20/327 |
| | | | | 235/379 |
| 2012/0075562 | A1* | 3/2012 | Yeh | G02F 1/1323 |
| | | | | 349/139 |
| 2012/0086940 | A1* | 4/2012 | Shih | G01N 21/211 |
| | | | | 356/307 |
| 2012/0106310 | A1* | 5/2012 | Shinoda | G11B 7/0903 |
| | | | | 369/109.01 |
| 2012/0120494 | A1* | 5/2012 | Takayama | G02B 5/1823 |
| | | | | 359/576 |
| 2013/0107366 | A1* | 5/2013 | Clarke | G02B 27/0172 |
| | | | | 359/567 |
| 2013/0337878 | A1* | 12/2013 | Shepherd | G07F 17/3223 |
| | | | | 463/11 |
| 2014/0043549 | A1* | 2/2014 | Taniguchi | G02F 1/13394 |
| | | | | 349/15 |
| 2014/0226093 | A1* | 8/2014 | Schwartz | G02B 26/004 |
| | | | | 349/12 |
| 2014/0232960 | A1* | 8/2014 | Schwartz | G02B 26/004 |
| | | | | 349/12 |
| 2014/0299884 | A1* | 10/2014 | Park | H01L 27/1259 |
| | | | | 257/72 |
| 2015/0234235 | A1* | 8/2015 | Park | G02F 1/133707 |
| | | | | 349/33 |
| 2015/0301390 | A1* | 10/2015 | Kim | G02F 1/133305 |
| | | | | 29/825 |
| 2016/0011441 | A1* | 1/2016 | Schwartz | G02F 1/1323 |
| | | | | 359/275 |
| 2016/0127525 | A1* | 5/2016 | Lee | H04M 1/0279 |
| | | | | 455/575.1 |
| 2016/0135314 | A1* | 5/2016 | Ma | G06F 3/041 |
| | | | | 428/177 |
| 2016/0299526 | A1* | 10/2016 | Inagaki | G06F 1/163 |
| 2016/0323966 | A1* | 11/2016 | Hamel | H05B 33/26 |
| 2017/0124937 | A1* | 5/2017 | Kim | G09G 3/2096 |
| 2017/0182753 | A1* | 6/2017 | Nakashima | B32B 27/00 |

FOREIGN PATENT DOCUMENTS

| | | |
|---|---|---|
| CN | 201519461 U | 7/2010 |
| CN | 102553225 A | 7/2012 |
| CN | 202590337 U | 12/2012 |
| CN | 202677526 U | 1/2013 |
| JP | 2006192244 * | 4/2005 |

OTHER PUBLICATIONS

Second Office Action for Chinese Patent Application No. 201410331747.5, dated Jan. 20, 2017, 9 pages.

Third Office Action for Chinese Patent Application No. 201410331747.5, dated Apr. 24, 2017, 7 pages.

First Office Action, including Search Report, for Chinese Patent Application No. 201410331747.5, dated Jun. 2, 2016, 10 pages.

Fourth Office Action from Chinese Patent Application No. 201410331747.5, dated Oct. 24, 2017, 9 pages.

* cited by examiner

MULTIPLAYER GAME MACHINE AND DISPLAY SYSTEM THEREOF

CROSS-REFERENCE TO RELATED APPLICATION

This application claims the benefit of the Chinese Patent Application No. 201410331747.5 filed on Jul. 11, 2014 in the State Intellectual Property Office of China, the whole disclosure of which is incorporated herein by reference.

BACKGROUND OF THE INVENTION

Field of the Invention

Embodiments of the present invention generally relate to an entertainment and competition apparatus, and in particular, to a multiplayer game machine and a display system thereof.

Description of the Related Art

It is common that people play chess, play cards or play mahjong for entertainment or competition. Usually, player should sit in a circle and prepare corresponding game items such as, for example, cards, mahjong, dices, tokens, or the like, if they want to play chess and cards. One problem for playing games in such a conventional way is that the game items may be lost or damaged, and preparation and storage of the game times are also troublesome and time consuming.

Accordingly, electronic game machines have been developed specially for such competitive games such as chess games and/or cards games. Such electronic game machine generally comprises a host computer and a plurality of player controlled terminals, each of which has a display screen and an operating device (or player instruction input device) dedicated to a respective game player. The host computer of such game machine often has a larger volume so as to separate and position the plurality of player control terminals at different sides, so that the players are prevented from peeping at each other in order to ensure fairness of a game. In addition, such a game machine needs to provide each game player with a dedicated display screen. Moreover, such a game machine is large, heavy, and of high cost.

SUMMARY OF THE INVENTION

In order to solve at least one of the above problems, the present invention provides a multiplayer game machine, and a display system for such a multiplayer game machine. With such a game machine, the players do not have to prepare game items, space that occupied by the game machine and the weight of the game machine can be reduced, and production cost of the game machine is also reduced.

According to one aspect of the present invention, there is provided a display system for a multiplayer game machine. The display system comprising: a main body; and a main display region and a plurality of secondary display regions arranged in the main body. The main display region is configured to display common information associated with a game and being viewable by all game players, each of the secondary display regions is configured to display game information associated with a certain game player, and each of the secondary display regions has an anti-peeping device to prevent other game players from peeping the game information associated with the certain game player.

According to another aspect of the present invention, there is provided a multiplayer game machine comprising the above display system.

BRIEF DESCRIPTION OF THE DRAWINGS

The above and other features of the present invention will become more apparent by describing in detail exemplary embodiments thereof with reference to the accompanying drawings, in which.

Figure 1:
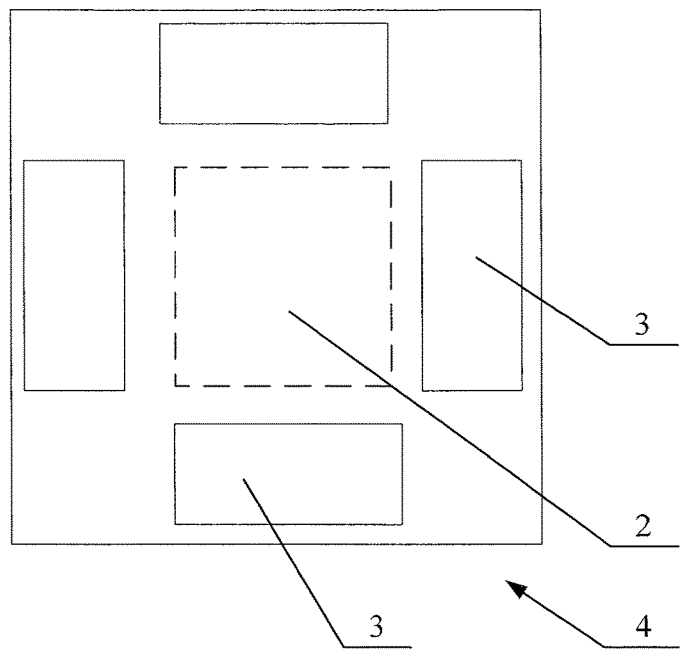
FIG. 1 is a top view of a multiplayer game machine according to a first embodiment of the present invention, showing a display system of the multiplayer game machine.

| List of reference numbers: | | |
|---|---|---|
| 1: support frame; | 2: main display region; | 3: secondary display region; |
| 4: first display screen; | 5: second display screen; | 6: third display screen; |
| 7: support post; | 8: grating-type anti-peeping structure; | |
| 11: base; | 12: support stage; | 81: wall; |
| 91: main panel; | 92: touch panel. | |

DETAILED DESCRIPTION OF PREFERRED EMBODIMENTS OF THE INVENTION

A display system and a multiplayer game machine including the display system according to the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present invention will be thorough and complete, and will fully convey the concept of the disclosure to those skilled in the art.

First Embodiment

FIG. 1 is a top view of a multiplayer game machine according to a first embodiment of the present invention, wherein the multiplayer game machine comprises a display system supported, for example, by a support stage, the display system comprises a main body and a display screen 4 held by the main body. As shown in the FIG. 1, the display screen 4 has a main display region 2 and at least two secondary display regions 3 (four secondary display regions are shown in FIG. 1). The main display region 2 is configured to display common information associated with a game and being viewable by all game players. The secondary display regions comprise display panels with anti-peeping devices (not shown) and are configured to display information dedicated to a certain game player.

When using the multiplayer game machine according to the first embodiment of the present invention to play a game, a plurality of (at least two) players, for example, may sit or stand around the support stage or the display screen of the multiplayer game machine. Each player plays the game with his/her dedicated secondary display region. The display panel of each secondary display region 3 comprises an anti-peeping device to prevent other players from peeping.

Specifically, players may select a desired game, for example, through a respective secondary display region 3 before the game. The main display region 2 displays common information that relates to the selected game and is viewable by all players. A respective secondary display region in front of each player is used for displaying information dedicated to the player, and due to the anti-peeping device, each player cannot view information displayed in other secondary display regions in front of other players and dedicated to the other players. The information includes, for example, information about cards in the hands of the players.

In addition, the multiplayer game machine further comprises player instruction input devices. The input devices may be separate input devices including, for example, buttons, joy sticks or the like, or the input device may be incorporated into the secondary display regions. For example, the display screen 4 is a touch screen or the display panels for the secondary display regions are touch panels, such that players' instructions can be received by the display panels of secondary display regions 3.

The multiplayer game machine according to the first embodiment of the present invention may further comprise other components necessary to play a multiplayer game, such as, for example, a processor, a controller, a memory, or the like, which is apparent to those skilled in the art and thereby detail descriptions thereof are omitted. For example, in one example, the processor is configured to receive instructions from the input devices, and after processing, the processer determines the contents to be displayed by the display system.

Therefore, at least one of the following technical effects can be achieved with the multiplayer game machine according to the first embodiment of the present invention:

1. A plurality of games can be provided for selection by players, and the players needs not to prepare game items, thereby eliminating the problems with lost or damage of the game items, and storage of various game items;

2. Players can be prevented from peeping by providing anti-peeping devices, meanwhile, the multiplayer game machine can be manufactured to be smaller in volume and thereby facilitate communications between players; and 3. Different information can be displayed in different regions of a large screen, thus there is no need to provide a plurality of display screens, thereby structural complexity and production cost can be reduced.

In the multiplayer game machine according to the first embodiment of the present invention, as shown in the FIG. 1, each secondary display region 3 may be preferably provided on a respective side of the display screen 4, and the main display region 2 is located in a central zone of the display screen 4.

Please note that the anti-peeping device may be realized in various ways. One example of the anti-peeping device is a block plate provided around a respective secondary display region and having a certain height. In another example, the anti-peeping device may comprise a grating-type anti-peeping device. The grating-type anti-peeping device may comprise a plurality of parallel gratings, each of which forms an angle relative to normal direction of respective display region or display screen, so that an allowed range of viewing angle of the respective display region or display screen can be limited within a predetermined angle range. In embodiments of the present invention, the plurality of parallel gratings may limit the allowed range of viewing angle of each secondary display region to an angle range, within which a certain player can normally view his/her dedicated information displayed in secondary display region while other players can not view such dedicated information, thereby the anti-peeping effect can be realized.

Second Embodiment

Figure 2:
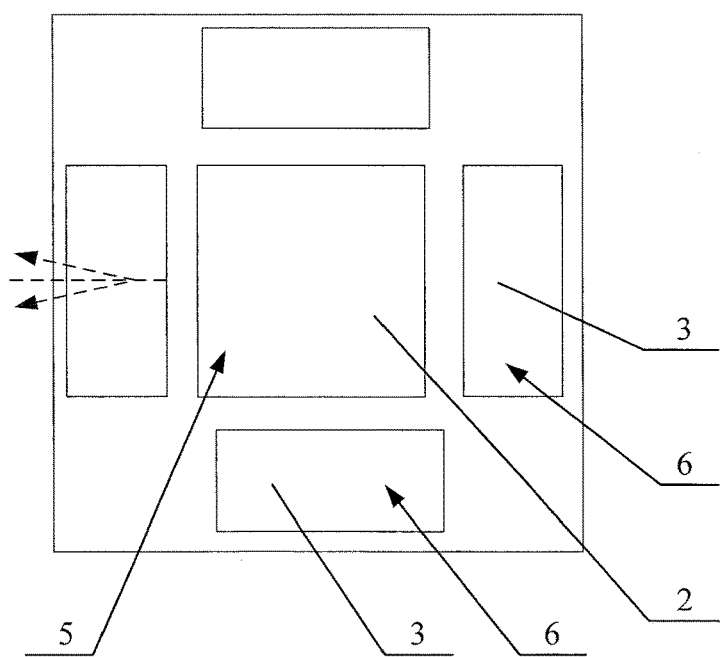
FIG. 2 is a top view of a multiplayer game machine according to a second embodiment of the present invention, showing a display system of the multiplayer game machine.
Figure 3:
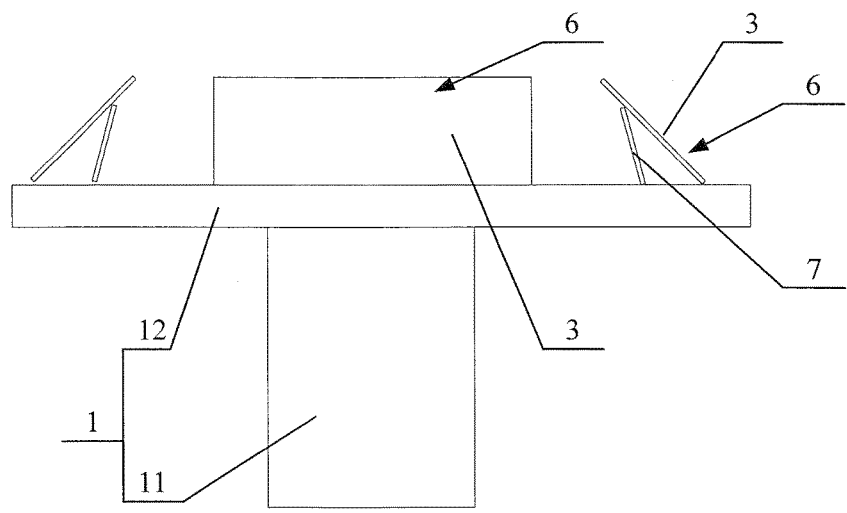
FIG. 3 is side view of the multiplayer game machine according to the second embodiment of the present invention.

FIGS. 2 and 3 are schematic diagrams showing a multiplayer game machine according to a second embodiment of the present invention. As shown in the figures, the multiplayer game machine according to the second embodiment of the present invention also comprises a display system supported, for example, by a support stage, but the display system comprises a main body and a plurality of display screens held by the main body.

In other words, the multiplayer game machine according to the second embodiment of the present invention differs from the multiplayer game machine according to the first embodiment of the present invention in that, in the second embodiment, the main display region 2 and the secondary display regions 3 are provided by separate display screens respectively. For example, a main display screen 5 provides the main display region 2, while a plurality of secondary display screens 6 provide the plurality of secondary display regions 3 respectively. According to the second embodiment, other anti-peeping means can be provided.

In one example, the secondary display screens 6 providing the secondary display regions 3 are configured to be pivotably connected to the support stage 12. Therefore, the secondary display screens 6 can be rotated at a certain angle relative to the plane of the support stage 12 according to instructions or operations of game players. The angles may be adjusted so that a game player can view his/her respective secondary display screen 6 more comfortably. Meanwhile, since the secondary display screen 6 can be rotated to face to the respective game player, it is more inconvenient for other game players to view the contents or information displayed in the display screen, and thereby the anti-peeping effect may be further improved. In order to keep the secondary display screens 6 at desired positions, a plurality of support posts 7 may be provided to support the secondary display screens 6 respectively, as shown in the FIG. 3. Of course, the secondary display screens 6 may also be kept at the desired positions by other means, such as, friction hinges or the like.

In the second embodiment, the secondary display screens 6 may be provided with other anti-peeping devices, for example, the block plate or the grating-type anti-peeping device as described above, so as to further improve the anti-peeping effect.

In one example, allowed range of viewing angle of a secondary display region 3 or the secondary display screen 6 may be limited to a range between five degrees to ten degrees by using a grating-type anti-peeping device, so as to provide a good anti-peeping effect. The range, for example, is indicated by the included angle between two arrowed broken lines shown in FIG. 2. The angle bisector of the included angle is the normal that is perpendicular to the secondary display screen 6.

Figure 4:
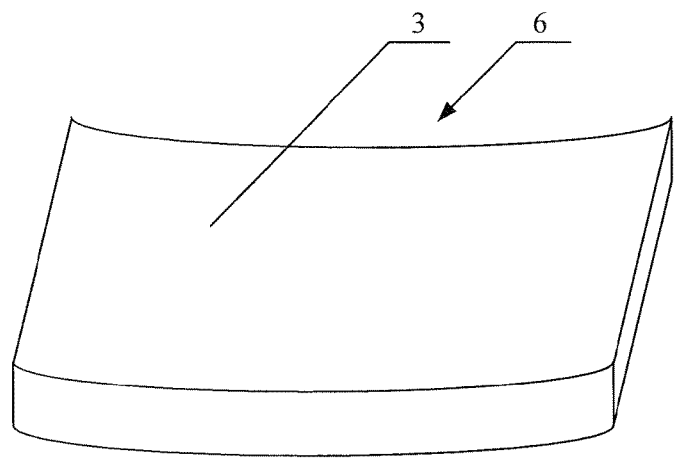
FIG. 4 is schematic structural diagram showing a flexible display screen for secondary display region of the multiplayer game machine.

In another example, as shown in the FIG. 4, each secondary display screen 6 may comprises a flexible display screen, the right side portion and the left side portion of which may be adjusted or warped upwards by a player, such that the display screen 6 is deformed into an arc-shape. Thus, the two side portions of the flexible display screen that are warped upwards may be used to block lines of sight from other players, thereby improving the anti-peeping effect.

In the first and second embodiments according to the present invention, the multiplayer game machine may further comprises a support frame 1, which comprise a base 11 and the above support stage 12. The support stage 12 may be in shape of a square (as shown in the FIG. 2) with the main display region 2 being located in a central position of the support stage 12 and four secondary display regions 3 being located adjacent to four sides of the support stage 12 respectively surrounding the main display region 2.

In other embodiments, the multiplayer game machine may be provided with six or eight secondary display regions 3 as required by games. Accordingly, the support stage 12 of the support frame 1 may have a regular hexagon shape or a regular octagon shape with the main display region 2 being located in the central position of the support stage 12 and the secondary display regions 3 being arranged adjacent to respective sides of the support stage 12 surrounding the main display region 2.

Embodiments of the Grating-Type Anti-Peeping Device

Figure 5:
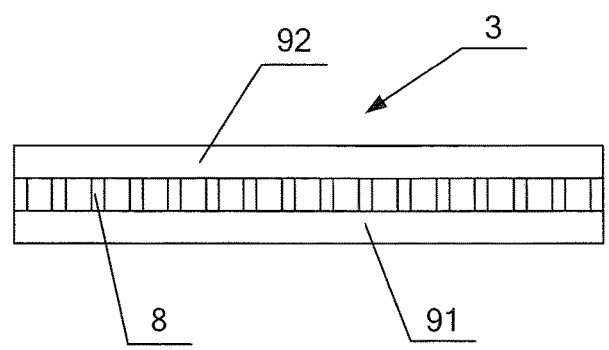
FIG. 5 is a schematic diagram showing a grating-type anti-peeping device for secondary display region of the multiplayer game machine.

FIG. 5 is a schematic diagram showing a grating-type anti-peeping device for the secondary display region 3. As shown, the structure of the secondary display region 3 may comprises a main panel 91 and a grating-type structure 8 disposed above the main panel 91. The grating structure 8 is used to provide the anti-peeping effect. The allowed range of viewing angle of the secondary display region 3 relates to the height of the grating-type anti-peeping structure 8. Specifically, the larger the height of the grating-type anti-peeping structure 8 is, the smaller the allowed range of viewing angle is, or the smaller the height of the grating-type anti-peeping structure 8 is, the larger the allowed range of viewing angle is.

As shown in FIG. 5, the secondary display region 3 may further comprise a touch panel 92 located above the grating-type anti-peeping structure 8. Therefore, the touch panel 92 may also acts as the player instruction input device as described above.

Figure 6:
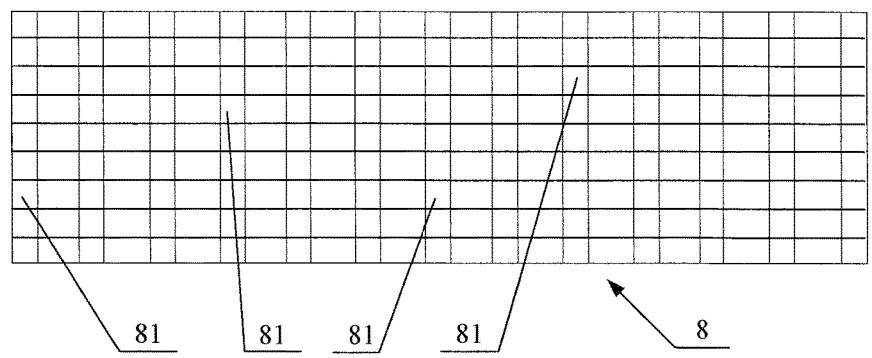
FIG. 6 is a schematic structural diagram showing a grating-type anti-peeping device according to one example.
Figure 7:
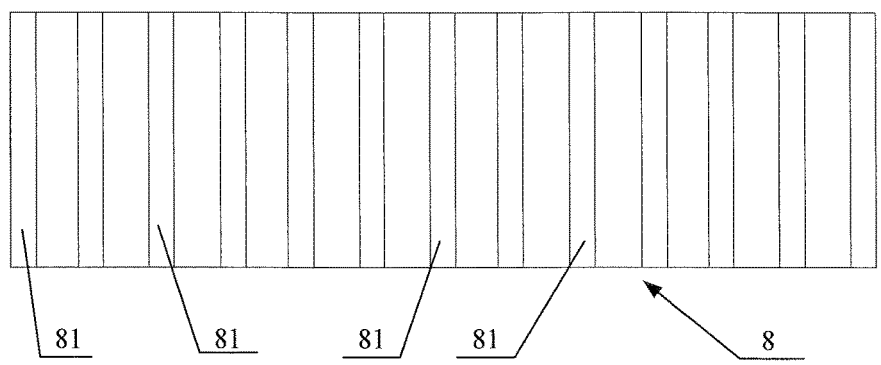
FIG. 7 is a schematic structural side view showing a grating-type anti-peeping device according to one example.
Figure 8:
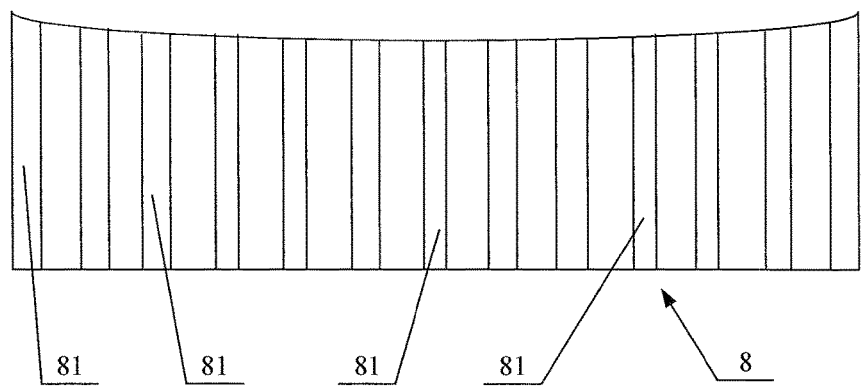
FIG. 8 is a schematic structural side view showing a grating-type anti-peeping device according to another example.

Preferably, the size of the grating-type anti-peeping structure 8 is substantially the same as that of the secondary display region 3, and as shown in the FIGS. 6-8, the grating-type anti-peeping structure 8 may comprises a plurality of walls 81 arranged parallel with each other. It is to be noted that, the walls 81 shown in FIGS. 6-8 have considerable thickness, but it is just to illustrate the wall 81 more clearly. The wall 81 may be very thin in practice so as not to adversely affect a game player viewing the information displayed in the secondary display region 3.

In one example, all walls 81 have the same height, as shown in the FIG. 7. In another example, as shown in the FIG. 8, the heights of the walls 81 gradually increase from the middle of the grating-type anti-peeping structure 8 to two side portions of the grating-type anti-peeping structure 8, so as to improve the anti-peeping effect and provide a better visibility of the secondary display region 3. Since the heights of the walls 81 in the middle of the grating-type anti-peeping structure 8 are lower than those at two side portions of the grating-type anti-peeping structure 8 the allowed range of viewing angle of the secondary display region 3 is relatively larger, thereby facilitating a certain player to view the information displayed in the secondary display region 3, In contrast, since the height of the walls 81 are higher at two side portions of the secondary display region 3, a better anti-peeping effect can be provided so that other players on two sides of the certain player cannot easily view the information displayed in the secondary display region 3. Moreover, usually two side portions of a secondary display region 3 are not used to display significant information, therefore this configuration will not adversely affected the player viewing information displayed in the secondary display region 3.

Other Aspects of the Multiplayer Game Machine

In one example, the main display region 2 of the display screen 4 may also be consisted of a touch panel. Players may input instructions through the touch panel of the main display region 2, and the players may control display panel of the each secondary display region 3 through the touch panel of the main display region 2.

In other some example, the main display region 2 may be of a shape other than the square shape shown in FIGS. 1 and 2. Moreover, the main display region 2 may include all other regions of the display screen 4 except the secondary display regions 3.

In one example, enabling and disenabling of each secondary display region 3 may be controlled through the main display region 2. Therefore, a three-player game can be played in a multiplayer game machine having, for example, four secondary display regions 3, and since the unused secondary display region 3 can be shut off, electric energy can be saved. In addition, even if one of the secondary display regions 3 of a four-player game machine is damaged, players can still play a three-player game with the four-player game machine using the other three secondary display regions 3. In other examples, separate control devices may be provided for independently controlling the enabling and disenabling of respective display regions, and/or the switch-on and switch-off of the multiplayer game machine.

In one example, the multiplayer game machine according to the present invention may further comprise a sound system (not shown). The sound system may provide various sounds, for example, sounds of playing card, triumphal cheers, or the like. The sound system may also provide sounds for prompting players to operate. Sounds volume can be adjusted, or the sound provided by the sound system may be received by earphones, so that the sound provided to a certain player will affect other players.

Another aspect of the present invention provides a display system, which is applicable in the multiplayer game machine as described above.

Although several exemplary embodiments have been shown and described, it would be appreciated by those skilled in the art that various changes or modifications may be made in these embodiments without departing from the principle and spirit of the disclosure, the scope of which is defined in the claims and their equivalents.

What is claimed is:

1. A display system for a multiplayer game machine, the display system comprising:
   a main body; and
   a main display region and a plurality of secondary display regions arranged in the main body,
   wherein the main display region is configured to display common information associated with a game and being viewable by all game players, each of the secondary display regions is configured to display game information associated with a certain game player, and each of the secondary display region has an anti-peeping device to prevent other game players from peeping the game information associated with the certain game player;
   wherein the anti-peeping device comprises a grating-type structure comprising a plurality of walls arranged in parallel with each other having bottom surfaces; and
   wherein each secondary display region comprises a planar main panel, the plurality of walls are arranged on an upper surface of the main panel at an intermediate portion and side portions of the upper surface of the main panel, such that all of bottom surfaces of the plurality of walls and the upper surface of the main panel lie in the same plane, and top surfaces of the plurality of walls gradually increase from the intermediate portion of the upper surface to the side portions of the upper surface.

2. The display system according to claim 1, wherein
   the main display region and the plurality of secondary display regions are provided by a same display screen which is a touch screen, and
   at least the secondary display regions are configured to receive instructions input by a game player through touching.

3. The display system according to claim 1, wherein
   the main display region is located at the center of the main body, and
   the plurality of secondary display regions are arranged around the main display region at equal intervals.

4. The display system according to claim 1, wherein
   the main display region is provided by a main display screen, and
   each of the secondary display regions is provided by a secondary display screen which is a touch screen.

5. The display system according to claim 4, wherein the secondary display screen is a flexible screen which is capable of being warped upwards at two opposite sides thereof.

6. The display system according to claim 4, wherein
   each secondary display screen is pivotably connected to the main body, and
   the display system further comprises a plurality of support frames for adjustably supporting the secondary display screens respectively.

7. The display system according to claim 1, wherein the anti-peeping device comprises block plates provided around the secondary display regions respectively.

8. The display system according to claim 1, further comprising a touch panel disposed on the grating-type anti-peeping device.

9. The display system according to claim 1, wherein the grating-type anti-peeping device is configured such that an allowed range of viewing angle of a secondary display region is equal to or less than ten degrees.

10. A multiplayer game machine, comprising the display system of claim 1.

11. The multiplayer game machine according to claim 10, wherein
    the main display region and the plurality of secondary display regions are provided by a same display screen which is a touch screen, and
    at least the secondary display regions are configured to receive instructions input by a game player through touching.

12. The multiplayer game machine according to claim 10, wherein
    the main display region is provided by a main display screen,
    each of the secondary display regions is provided by a secondary display screen which is a touch screen.

13. The multiplayer game machine according to claim 12, wherein the secondary display screen is provided by a flexible screen which is capable of being warped upwards at two opposite sides thereof.

14. The multiplayer game machine according to claim 12, wherein
    each secondary display screen is pivotably connected to the main body, and
    the display system further comprises a plurality of support frames for adjustably supporting the secondary display screens respectively.

15. The multiplayer game machine according to claim 10, wherein the multiplayer game machine further comprises one or more of following components:
    a support stage for supporting the display system;
    a sound system; and
    a controlling device for controlling switch-on and switch-off of the multiplayer game machine and for controlling enabling and disenabling of the secondary display regions.

16. The display system according to claim 9, wherein the grating-type anti-peeping device is configured such that the allowed range of viewing angle of the secondary display region is equal to or less than five degrees.

* * * * *